Sept. 7, 1943.    W. R. FREEMAN    2,328,637
BRAKE ACTUATING SYSTEM
Filed May 2, 1941    2 Sheets—Sheet 2
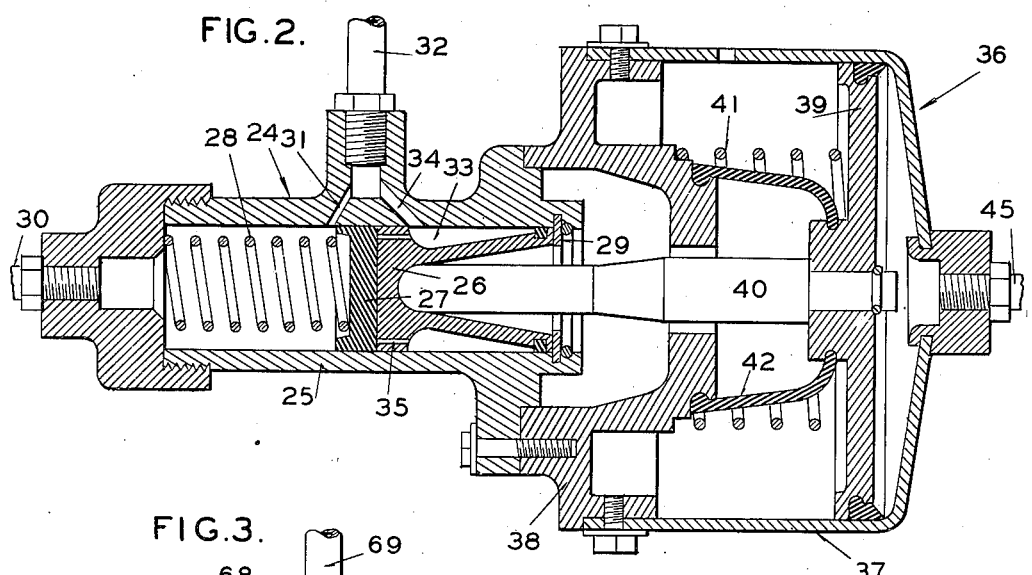
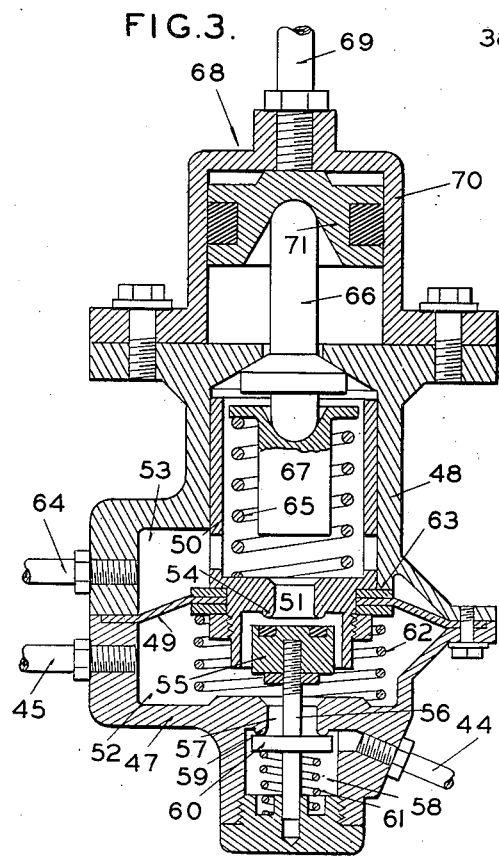
INVENTOR
W. R. FREEMAN
BY
ATTORNEY Patented Sept. 7, 1943

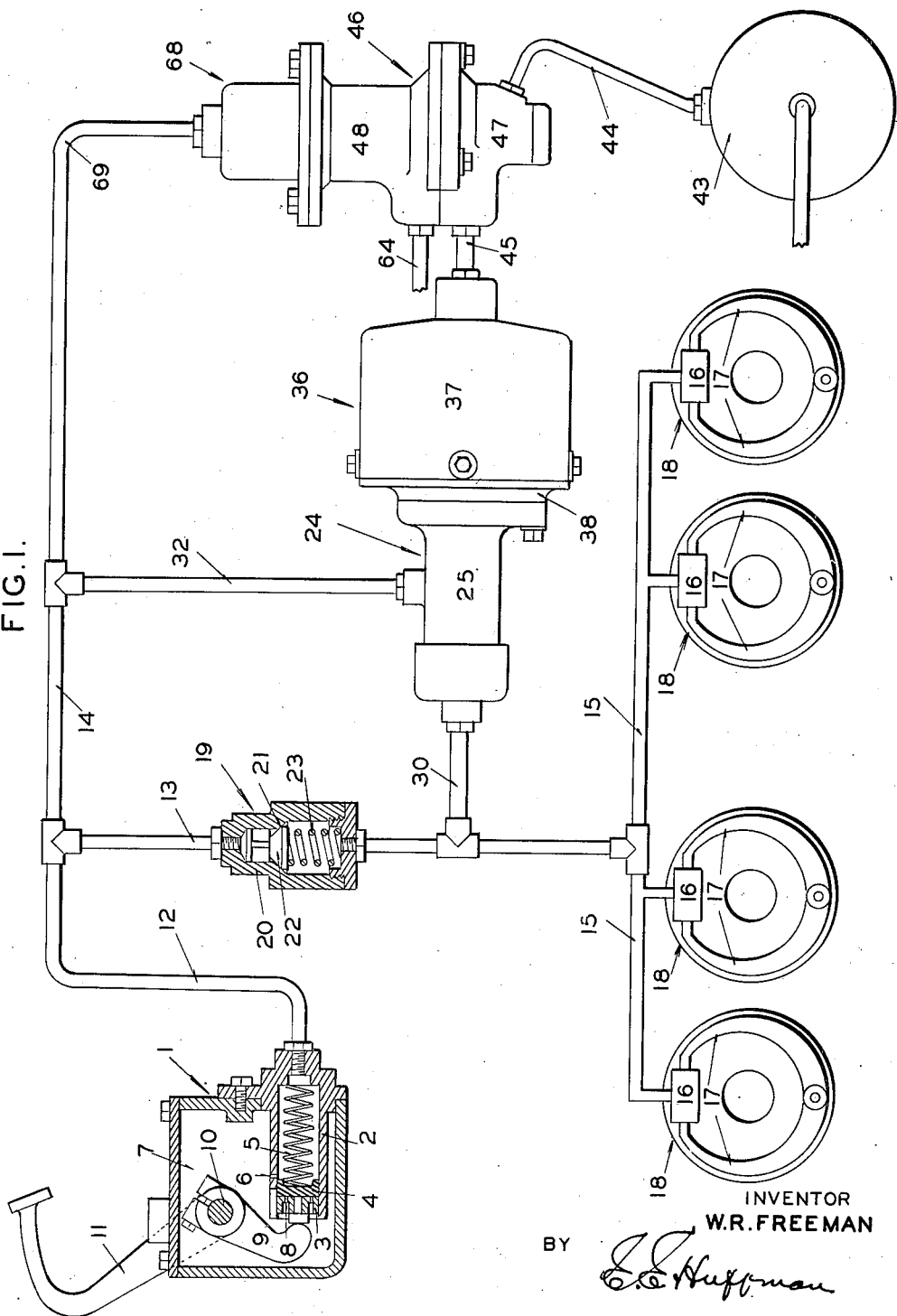

2,328,637

UNITED STATES PATENT OFFICE 2,328,637

BRAKE ACTUATING SYSTEM

Walter R. Freeman, Clayton, Mo., assignor to Wagner Electric Corporation, St. Louis, Mo., a corporation of Delaware Application May 2, 1941, Serial No. 391,451

5 Claims. (Cl. 188—152)

My invention relates to brakes and more particularly to a brake actuating system.

One of the objects of my invention is to produce an improved brake actuating system whereby the brakes can be hydraulically-actuated either by a power-operated device under the control of a manually-operated member or in the event of failure of the power-operated device by manual force transmitted from the manually-operated member.

Another object is to so combine a manually-controlled hydraulic actuating system and an air pressure operated system that a member can be operated by hydraulic pressure developed either by the air pressure operated system or by a pedal-operated master cylinder, and wherein the control of the air pressure operated system is governed by hydraulic pressure developed by the pedal-operated master cylinder.

Another object of my invention is to produce a braking system of the type referred to which is so arranged that the brakes may be initially applied by hydraulic pressure developed by the pedal-operated master cylinder and then subsequently applied by hydraulic pressure developed by the air pressure operated system, said braking system being so arranged that the hydraulic pressure developed by the air pressure system will be controlled by hydraulic pressure developed by the pedal-operated master cylinder and without any reaction on the pedal by the hydraulic pressure being developed by said air pressure system.

Other objects of my invention will become apparent from the following description taken in connection with the accompanying drawings in which Figure 1 is a schematic view of the braking system; Figure 2 is a sectional view of the secondary master cylinder and power cylinder; and Figure 3 is a sectional view of the hydraulically-operated metering valve for the air pressure system.

Referring to the drawings in detail, numeral 1 indicates a pedal-operated master cylinder device of known construction comprising a cylinder 2 having reciprocable therein a piston 3 with which is associated a packing cup 4. A retracting spring 5 normally biases the piston to an inoperative position and when in this position the cup will uncover a porthole 6 for placing the portion of the cylinder ahead of the piston in communication with a reservoir 7 surrounding the cylinder. The piston is provided with passages 8 to permit fluid to flow past the piston and the cup during retractile movement of the piston and thus prevent any subatmospheric pressure from developing in the system. The piston is actuated by an arm 9 secured to a cross-shaft 10 mounted in the reservoir and connected at its outer end to the pedal 11.

The forward end of the cylinder is connected to a conduit 12 having branch conduits 13 and 14. The branch conduit 13 is in turn connected to additional branch conduits 15 which lead to fluid motors 16 for actuating the brake shoes 17 of the brake assemblies 18. Associated with the branch conduit 13 is a check valve 19 comprising a casing 20 having a seat 21 with which cooperates a valve element 22 normally biased on the seat by a light spring 23.

In addition to the pedal-operated master cylinder there is a secondary master cylinder device 24 comprising a cylinder 25 in which is a reciprocable piston 26 provided with a sealing cup 27. Interposed between the cup and the forward end of the cylinder is a retracting spring 28 for normally biasing the piston to its normally inoperative position against a stop 29. The forward end of the cylinder is connected to a conduit 30 which is joined with the branch conduit 13 at a point spaced between the check valve 19 and the fluid motors 16. The cylinder 25 has a porthole 31 which is in constant communication with a conduit 32 connected to the branch conduit 14 previously referred to. This porthole is so positioned that when the piston is in retracted position it will uncover it and thus permit free two-way communication between the conduits 32 and 30 by way of the cylinder. Since the conduit 32 is in communication with the master cylinder 1, it is also apparent that there is free two-way communication between the main master cylinder and the fluid motors.

The piston 26 of the secondary master cylinder is of the spool-type, thus providing an annular chamber 33 at the rear of the piston head. This chamber is in constant communication with the conduit 32 by way of a hole 34. The head of the piston is provided with passages 35 in order to facilitate flow of fluid from the said chamber at the rear of the piston head and past the packing cup to the cylinder ahead of the piston. Thus, with a body of fluid maintained behind the piston head sub-atmospheric pressure cannot develop ahead of the piston during its retractile movement and cause air to be drawn past the piston into the system.

The secondary master cylinder 24 is connected to be operated by a power cylinder 36. As shown in Figure 2, this power cylinder comprises a cylinder 37 secured in axial alignment with cylinder 25 by means of a connecting member 38. Within cylinder 37 is a piston 39 and carried thereby is a piston rod 40 for abutting piston 26 of the secondary master cylinder. A spring 41 normally biases piston 39 to its inoperative position. There is also provided a boot 42 to exclude dust from the rear end of the master cylinder piston.

The power cylinder is operated by air pressure from a suitable source such as the air tank 43 which is connected to the power cylinder by conduits 44 and 45 and an interposed metering control valve 46. As shown in Figure 3, this control valve is of known construction and comprises two casing members 47 and 48 between which is clamped a diaphragm 49. Secured to the diaphragm is a slidable cylindrical member 50 guided in casing 48 and provided with an opening 51 in its lower end wall for placing the chambers 52 and 53 on opposite sides of the diaphragm in communication with each other. The lower side of the opening 51 is provided with a valve seat 54 for cooperation with a valve element 55 mounted on a stem 56 which extends through an opening 57 for placing the chamber 52 in communication with an inlet chamber 58 and the air tank by means of the conduit 44 already referred to. The lower side of the opening 57 has a valve seat 59 and cooperating therewith is a valve element 60 also carried by the stem 56. A spring 61 normally biases the valve element 56 to a closed position. A spring 62 acts on the slidable member 50 to hold it in an inoperative position against a stop 63 where the valve element 55 will be unseated. The chamber 53 above the diaphragm is in constant communication with the atmosphere by way of a conduit 64. Within the cylindrical member 50 is a coil spring 65 which is adapted to be compressed by the valve actuating rod 66 through a member 67 resting on the top of the spring.

In order to control the operation of the metering valve by means of the actuating rod 66, there is provided a fluid motor 68 which is in constant communication by a conduit 69 with the branch conduit 14 previously referred to. The fluid motor comprises a cylinder 70 secured to the top of the casing member 48 and a piston 71 abutting the top of the actuating rod 66.

Referring now to the operation of my improved braking system, the parts of the two master cylinders, the power cylinder and the control valve are in the positions shown in the various figures when the brake system is inoperative. The cylinders of the master cylinder, all the conduits 12, 13, 14, 15, 32, and 69, the fluid motors 16, and the fluid motor 68 are filled with a suitable hydraulic brake fluid as is also the reservoir 7. When the brake is inoperative, the brake actuating fluid motors are in free two-way communication with reservoir 7 since the portholes 6 and 31 are uncovered. Thus, the fluid is free to contract or expand due to changes in temperature.

When it is desired to apply the brakes and the pedal is operated, the porthole 6 will be first cut off and piston 3 will begin to develop pressure. Fluid under pressure can now flow to and actuate the brake actuating fluid motors 16, the path of flow being either by way of the check valve or by way of the secondary master cylinder, whichever path offers the least resistance. When the fluid pressure developed by the main master cylinder reaches a value greater than that required to initially apply the brake shoes by means of the fluid motors 16, piston 71 of the fluid motor 68 will be moved downwardly against the bias of the fairly strong spring 62 of the air pressure control valve. Movement of piston 71 moves the cylindrical member 50 downwardly through the spring 65. This will now cause valve 55 to be seated to cut off chamber 52 from communicating with the atmosphere. Additional downward movement of the cylindrical member 50 will now unseat the valve 60, thereby admitting fluid under pressure from the air tank to chamber 52 and cylinder 36 of the power cylinder to thus cause movement of the piston therein to the left. The operation of the power cylinder will move piston 26 of the secondary master cylinder and when this piston closes the porthole 31, it will begin to increase the pressure of the fluid which is present in cylinder 25 and already under pressure as a result of operation of the main master cylinder 1. When piston 26 begins to develop this additional pressure, such pressure will be effective only in fluid motors 16 of the brake assemblies as the check valve 19 will prevent this fluid under pressure from becoming effective in the cylinder of the main master cylinder or the fluid motor 68.

The amount of air pressure admitted to the power cylinder to operate the secondary master cylinder will be solely dependent upon the hydraulic pressure developed by the pedal-operated master cylinder. This hydraulic pressure, of course, will be less than the hydraulic pressure being developed by the secondary master cylinder due to it being actuated by the power cylinder. The extent of movement of piston 71 of fluid motor 68 will control the amount of air pressure effective on the power cylinder. When the valve element 60 is opened by a predetermined downward movement of piston 71 and the actuating rod 66, spring 65 will be compressed. As soon as the pressure in chamber 52 reaches a value sufficient to move the diaphragm and member 50 upwardly against the bias of spring 65 and to a position where valve 60 can again be seated, the air admitted to the power cylinder will be cut off. Thus, the valve will be in its lapped position and no additional air pressure will be admitted to the power cylinder until piston 71 is again moved downwardly by hydraulic pressure created by the pedal-operated master cylinder.

When it is desired to release the brakes, pedal 11 is released, thereby releasing the pressure acting on piston 71 of the fluid motor. The cylindrical member 50 of the control valve will now be moved upwardly by spring 62, thereby opening the valve element 55 (after valve element 60 is seated) and permitting fluid to exhaust from the power cylinder. All of the hydraulic fluid under pressure in fluid motors 16 of the brakes can now be forced back into cylinder 25 of the secondary master cylinder under the action of the usual retracting spring of the brakes (not shown). Spring 28 also assists in returning piston 26 of the secondary master cylinder. When piston 26 reaches its fully retracted position, porthole 31 will be uncovered and the excess fluid, if any, in cylinder 25 and the brake actuating fluid motors will now be free to return to the main master cylinder and its reservoir since porthole 6 of the main master cylinder has also been uncovered. If, during the retracting movement of either of the master cylinder pistons, there should be a tendency for sub-atmospheric pressure to be developed ahead of the pistons, fluid can flow past the pistons and prevent such in the manner already described. Thus there is no danger of air being drawn into the system.

In the event there should be a failure of the air pressure system, the brakes can, nevertheless, be applied by the main master cylinder. Thus, the operator is always provided with an operable brake system. In the event there should be partial failure of the power means; that is, insufficient air pressure to properly operate the brakes, the operator may, nevertheless, manually apply additional hydraulic fluid under pressure to the fluid motors 16 notwithstanding that porthole 31 may be covered and without the necessity of by-passing fluid past piston 26 and its sealing cup 27. This is accomplished by means of the unseating of check valve 19.

It is to be noted in connection with the braking system that the brakes after being initially applied are controlled solely by the pressure developed by the main pedal-operated master cylinder but this pressure being developed need only be great enough to operate the air pressure control valve. Thus it is possible to obtain a very great braking action by a small manual effort. Once the secondary master cylinder comes into operation, there is no necessity for any great displacement of fluid by the pedal-operated master cylinder as this fluid is transmitted to the fluid motor 68 only and not to the brake actuating fluid motors. It is also to be noted that the arrangement of the system is such that the fluid pressure developed by the secondary master cylinder as a result of the operation of the power cylinder does not in any way create a reaction on the piston and the brake pedal of the main master cylinder. Thus, there is no necessity for the operator to work against the secondary master cylinder after said master cylinder begins to develop pressure. The operator, nevertheless, has a "feel" of the brakes as the amount of air pressure being employed to operate the secondary master cylinder reacts on piston 71 of the fluid motor 68 through the diaphragm and spring 65 and, of course, since this piston is operated by the main master cylinder, it will also react back on the brake pedal.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a fluid motor for actuating a member, a manually-controlled master cylinder device, a separate cylinder, a piston and packing cup therein, conduit means for connecting the master cylinder device and the separate cylinder to the fluid motor, check valve means associated with the conduit means for preventing at all times return flow of fluid under pressure through the conduit means from the fluid motor to the master cylinder device, by-pass means around the check valve for permitting two-way communication between the master cylinder and fluid motor, said by-passing means comprising a small porthole in the wall of said separate cylinder so controlled by the movement of the piston as to permit said two-way communication only when the piston and packing cup are in inoperative position, and power-operated means controlled by fluid pressure developed by the master cylinder for actuating the piston and causing fluid pressure developed thereby to act only on the fluid motor.

2. In braking apparatus, a brake, a fluid motor for actuating the brake, a manually-controlled master cylinder device, a cylinder, a piston and packing cup therein, conduit means for connecting the master cylinder device and the cylinder to the fluid motor, check valve means associated with the conduit means for preventing at all times return flow of fluid under pressure through the conduit means from the fluid motor to the master cylinder device, by-pass means around the check valve for permitting two-way communication between the master cylinder and fluid motor and comprising a porthole in the wall of said cylinder uncovered by the piston and packing cup when in inoperative position so as to permit said two-way communication only when the piston is in said position, and power-operated means controlled by fluid pressure developed by the master cylinder for actuating the piston and causing fluid pressure developed thereby to act only on the fluid motor.

3. In a brake actuating system, a fluid motor for actuating a brake, a pedal-operated master cylinder, a second master cylinder comprising a piston a packing cup therefor and a cylinder, said cylinder being provided with a porthole in its wall uncovered by the piston and packing cup therein when in retracted position, conduit means connecting the porthole to the pedal-operated master cylinder, by-pass conduit means around the second master cylinder for establishing communication from the pedal-operated master cylinder to the fluid motor, a check valve in the by-pass for permitting fluid to flow therethrough only from the pedal-operated master cylinder to the fluid motor, power-operated means for actuating the second master cylinder, and means comprising a fluid motor communicating with the pedal-operated master cylinder for controlling the power-operated means by fluid pressure developed by said pedal-operated master cylinder.

4. In a brake actuating system, a fluid motor for actuating a brake, a pedal-operated master cylinder, a second master cylinder comprising a piston a packing cup therefor and a cylinder, said cylinder being provided with a porthole in its wall uncovered by the piston and packing cup therein when in retracted position, conduit means connecting the porthole to the pedal-operated master cylinder, by-pass conduit means around the second master cylinder for establishing communication from the pedal-operated master cylinder to the fluid motor, a check valve in the by-pass for permitting fluid to flow therethrough only from the pedal-operated master cylinder to the fluid motor, a power cylinder for actuating the piston of the second master cylinder, a source of air pressure, means comprising a valve for controlling the flow of air pressure to the power cylinder, a fluid motor for actuating the valve, and conduit means for connecting the last named fluid motor to the pedal-operated master cylinder.

5. In braking apparatus, a brake, a fluid motor for actuating the brake, a manually-controlled master cylinder comprising a cylinder, a piston, a reservoir and means permitting the reservoir to have two-way communication with the cylinder ahead of the piston only when the piston is in retracted position, a second cylinder, a piston and packing cup therein, conduit means for connecting the cylinder of the master cylinder and the second cylinder to the fluid motor, power-operated means for actuating the piston of the second cylinder, means for controlling the power-operated means by fluid pressure developed by the master cylinder, check valve means associated with the conduit means for causing the fluid pressure developed by the piston in the second cylinder to be effective only in actuating the fluid motor and a two-way communication by-pass around the check valve comprising a small porthole in the wall of the second cylinder uncovered by the piston and packing cup only when said piston and cup are in retracted position.

WALTER R. FREEMAN.